US 6,616,423 B2

United States Patent
Bosen

(10) Patent No.: US 6,616,423 B2
(45) Date of Patent: Sep. 9, 2003

(54) TURBO EXPANDER HAVING AUTOMATICALLY CONTROLLED COMPENSATION FOR AXIAL THRUST

(76) Inventor: Werner Bosen, Haupstrasse 95b, D-51143 Köln (DE)

( * ) Notice: Subject to any disclaimer, the term of this patent is extended or adjusted under 35 U.S.C. 154(b) by 0 days.

(21) Appl. No.: 10/004,330

(22) Filed: Nov. 2, 2001

(65) Prior Publication Data

US 2003/0026714 A1 Feb. 6, 2003

(30) Foreign Application Priority Data

Aug. 3, 2001 (DE) .......................... 101 38 056

(51) Int. Cl.[7] .............................................. F04B 35/02
(52) U.S. Cl. ...................... 417/365; 417/361; 417/406; 417/407; 415/104; 415/106
(58) Field of Search ................. 417/361, 365, 417/406, 407; 415/104, 106

(56) References Cited

U.S. PATENT DOCUMENTS

| | | | |
|---|---|---|---|
| 3,828,610 A | * | 8/1974 | Swearingen ............ 73/862.49 |
| 4,472,107 A | * | 9/1984 | Chang et al. ................ 415/104 |
| 5,248,239 A | * | 9/1993 | Andrews .................... 415/104 |
| 6,310,414 B1 | * | 10/2001 | Agahi et al. ................ 310/40.5 |

* cited by examiner

*Primary Examiner*—Charles G. Freay
*Assistant Examiner*—Emmanuel Sayoc
(74) *Attorney, Agent, or Firm*—Collard & Roe, P.C.

(57) ABSTRACT

A turbo-machine includes a housing (1); a rotor (3) of a centripetally flow-through expansion turbine stage (4) overhung on the one end of the rotor shaft; a rotor of a radially flow-through compressor stage (6) overhung on the other end of the rotor shaft; a measuring system (7) for directly detecting an axial thrust of the rotor shaft (2) supported in roller bearings (8); and at least two pressure control valves (10, 11), which are installed in control lines (12, 13) and controlled by a controller (9). Via the control lines (12, 13), a rotor piston surface (14), which is sealed against the housing (1) and located on the rear side of one of the rotors, for example the compressor rotor (5), can be acted upon by the pressure ($p_1$) prevailing on the inlet into the compressor stage, and the pressure ($p_2$) on the outlet of the compressor stage (6). The controller (9) actuates either the pressure control valve (10) in the control line (12) acted upon by the compressor inlet pressure ($p_1$) or the pressure control valve (11) in the control line (13) under the compressor outlet pressure ($p_2$) according to the measured axial thrust, in order to eliminate an axial thrust outside of a preselected nominal value range by raising or reducing the pressure on the rotor control surface (14).

8 Claims, 3 Drawing Sheets

TURBO EXPANDER HAVING AUTOMATICALLY CONTROLLED COMPENSATION FOR AXIAL THRUST

CROSS REFERENCE TO RELATED APPLICATIONS

Applicant claims priority under 35 U.S.C. §119 of German Application No. 101 38 056.9 filed Aug. 3, 2001.

BACKGROUND OF THE INVENTION

1. Field of the Invention

The present invention relates to a turbo-machine. The turbo-machine includes a housing; a rotor shaft; a rotor of a centripetally flow-through turbine expansion stage that is mounted on one end of the rotor shaft; and a rotor of a radially flow-through compressor stage that is mounted on the other end of the rotor shaft.

2. The Prior Art

Turbo-machines with the structure described above, which are referred to also as turbo-expanders, are preferably operated at high pressure levels in industrial applications. In such applications, the outlet pressure of the turbine, which is directed in the axial direction of the rotor shaft, frequently deviates to a high degree from the pressure on the compressor inlet, which is axially directed as well. High axial forces of thrust are exerted on the rotor shaft operating at a high number of revolutions because of the in pressure between the compressor stage and the expansion stage of the turbine. The axial thrust can be completely absorbed by an adequately dimensioned axial bearing; however, axial bearings rated for absorbing high axial operating thrusts generate considerable loss capacities. The loss capacity of the axial bearings rated for the least favorable operating conditions may amount to from 5% to 10% of the expansion capacity of the turbine. The driving capacity available in the compressor stage is diminished accordingly. This reduces the overall degree of efficiency of a plant, for example a refrigeration plant in which the turbo-machine is used.

The use of inclined high-precision ball bearings, which produce only low losses even at very high numbers of revolution, seems to be advantageous. Such inclined high-precision ball bearings can be operated in specially designed types of turbines with a product of the number and diameter of up to $2.5 \times 10^6$ mm/min. This value is adequate for operating, for example a refrigeration turbo-expander with an expansion pressure ratio of pin/pout=10 in the expansion stage of the turbine. However, high-precision roller bearings will reach an acceptably long useful life only if the roller bearings are subjected to low forces, in particular low axial forces in a continuous operation. The permissible values are not adequate in the normal case for absorbing the axial thrusts and shocks occurring in the course of operation of a turbo-expander.

The invention addresses the problem of providing in a turbo-expander compensation for axial thrust that can be controlled automatically and will also automatically adapt itself to different operating conditions of the turbo-expander.

SUMMARY OF THE INVENTION

The problem is solved in accordance with the invention with a turbo-machine including a housing; a rotor shaft; a rotor of a centripetally flow-through turbine expansion stage, the rotor being overhung on one end of the shaft of the rotor; a rotor of a radially flow-through compressor stage, the rotor being overhung on the other end of the shaft of the rotor; a measuring system for directly detecting any axial thrust of the rotor shaft supported in roller bearings; and at least two pressure control valves controlled by a controller in control lines.

In accordance with the invention, a surface located on the back side of one of the rotors and sealed against the housing, can be acted upon by the pressures prevailing on the inlet and outlet of the stage. Depending on the measured axial thrust, the controller actuates either the pressure control valve in the control line under the higher pressure or the pressure check valve that is under the lower pressure. Any axial pressure outside of a preset tolerance range is thereby eliminated by raising or reducing the pressure acting on the surface of the rotor piston.

The rear side of the compressor rotor may be provided with the surface of the rotor piston. The pressure prevailing in the compressor stage and the pressure on the outlet of the compressor stage can be admitted to the surface via the control lines. The controller will actuate according to the measured axial thrust either the pressure control valve located in the control line through which the compressor inlet pressure is admitted, or the pressure control valve installed in the control line that is under the compressor outlet pressure. However, also within the scope of the invention is an embodiment in which the surface of the rotor piston is provided on the rear side of the rotor of the expansion stage of the turbine.

A permissible axial thrust is fixed for the roller bearing of the rotor shaft. During the operation of the turbo-machine, the controller compares the axial thrust values recorded by the measuring system with the preset range of the nominal values. If the measured axial thrust is outside of the range of the nominal values, one of the two pressure control valves is controlled to correct the axial thrust. The pressure acting on the surface of the rotor piston can be controlled by the pressure control valves in a highly sensitive manner. The pressure acting on the surface of the rotor piston can be raised or reduced depending on the direction in which the axial thrust needs to be corrected.

According to a further development in accordance with the invention, additional control lines may be provided which each comprise a valve. Also provided is an additional surface of the rotor piston, which is sealed against the housing and located on the rear side of the other rotor. The additional piston surface can be acted upon by the pressure prevailing on the inlet of this stage and the pressure on the outlet of this stage by way of the additional control lines.

The valves of the additional control lines can take the form of pressure control valves that are controlled by the controller as well. In this way, the controller controls the pressure control valves installed in the control lines as well as in the additional control lines. The valves are controlled so that the changes in pressure occurring on the rotor piston surfaces of the compressor rotor and the rotor of the turbine complement one another so that the force of compensation for compensating the axial thrust is intensified. To that extent, the pressure control valves are wired, for example so that an increase in the pressure on the rotor piston surface of the compressor stage is combined with a reduction in the pressure on the rotor piston surface of the turbine rotor. Any reduction in the pressure acting on the rotor piston surface of the compressor rotor is accordingly combined with an increase in the pressure acting on the rotor piston surface of the turbine rotor. In this embodiment, very high forces of compensation may be raised and controlled precisely. In this way, the axial thrust of the rotor shaft may be maintained within a narrow range of the nominal value that is permissible for high-precision roller bearings.

It is within the scope of the invention as well that the valves of the additional control lines are rapidly opening switching valves, for example magnetic valves. Rapidly opening switching valves are useful to rapidly correct abrupt changes occurring in the axial thrust. The lower or higher pressure is consequently rapidly admitted in full strength to the additional surface of the rotor piston.

According to a preferred embodiment of the invention, the measuring system includes a ring-shaped force absorber that is arranged between an outer bearing ring of a roller bearing and the corresponding stop surface of the housing. The ring is located on the side of the housing and stressed by the axial thrust of the rotor shaft. The force absorber may include extensometer (or expansion measuring) strips and thus measures independently of time unchanging axial thrusts as well. For example, an initial axial tensioning force of the bearing in the idle state may be measured without pressure being admitted to the turbo-machine.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
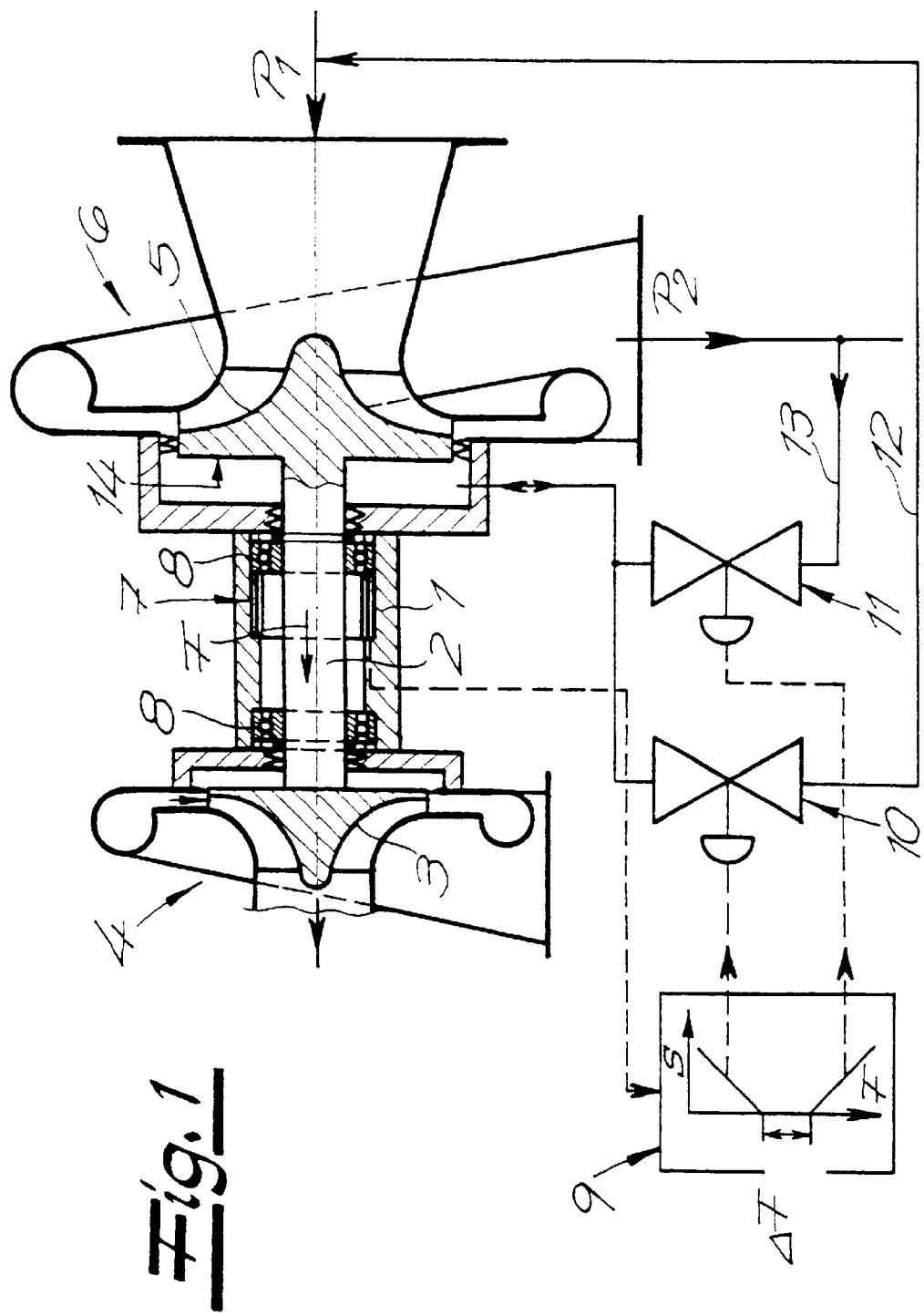
FIG. 1 is a longitudinal section through a turbo-machine including a device for compensating the axial thrust as defined by the invention.

Referring now to the drawings, and in particular to FIG. 1, the basic structure of the turbo-machine is shown. The turbo-machine includes a housing 1 and a rotor with a rotor shaft 2 having first and second ends rotatably supported in roller bearings in housing 1. A centripetally flow-through turbine expansion stage 4 includes a rotor 3 mounted on the rotor shaft so as to overhang one end of the rotor shaft. Turbine expansion stage 4 has an inlet and an outlet. A radially flow-through compressor stage 6, includes a rotor 5 mounted on the rotor shaft so as to overhang the other end of rotor shaft 2. Compressor stage 6 likewise has an inlet and an outlet. The turbo-machine is equipped with a measuring system 7 disposed in housing 1 for directly detecting an axial thrust of the rotor shaft 2 supported in the roller bearings 8. Also included are at least two pressure control valves 10, 11, which are controlled by a controller 9 coupled to measuring system 7 as shown by the dashed lines in FIG. 1. One pressure control valve 10 is arranged in a control line 12 that is connected with the inlet of compressor stage 6. The other pressure control valve 11 is installed in a control line 13 that is connected with the outlet side of compressor stage 6.

Via control lines 12, 13, a rotor piston surface 14, which is sealed against the housing 1 and located on the rear side of the compressor rotor 5, can more or less be acted upon by the lower pressure $p_1$ prevailing on the inlet leading into the compressor stage, and by the higher pressure $p_2$ acting on the outlet of compressor stage 6. Depending on the measured axial thrust, controller 9 either actuates pressure control valve 10 installed in control line 12, which is acted upon by the compressor inlet pressure $p_1$, or actuates pressure control valve 11 installed in control line 13, which is under the compressor outlet pressure $p_2$. In this way, any axial pressure outside of a preset tolerance range may be eliminated by either raising or reducing the pressure acting on the rotor piston surface 14. The figures show that control lines 12, 13 are connected on the rear side of compressor rotor 5 with compressor stage 6; and that rotor piston surface 14 is formed in the exemplified embodiment by a rear surface of compressor rotor 5 that is sealed against housing 1.

Measuring system 7 includes a ring-shaped force absorber, which is arranged between an outer bearing ring of a roller bearing 8 located on the housing side and a stop surface of the housing 1. The ring is stressed by an axial thrust of the rotor shaft 2. The force absorber operates with extensometer-type strips. If the measured force value F detected by measuring system 7 is outside of the range $\Delta F$ preset for the nominal value, one of the two pressure control valves 10, 11 is controlled. If, for example, the measured value F is below $\Delta F$, pressure control valve 10 acted upon by the compressor inlet pressure $p_1$ is controlled, and the pressure acting on rotor piston surface 14 is reduced until the measured value is again within the range preset for the nominal value. If the measured value F rises above $\Delta F$ nominal, pressure control valve 10 is first controlled to move back (or reverse) until it is closed again. Only if the measured value F continues to remain above $\Delta F$ nominal will the controller actuate the other pressure control valve 11, which is installed in the control line acted upon by the outlet pressure $p_2$. The pressure acting on rotor piston surface 14 is thereby increased until the measured value is again within the range preset for the nominal value.

Figure 2:
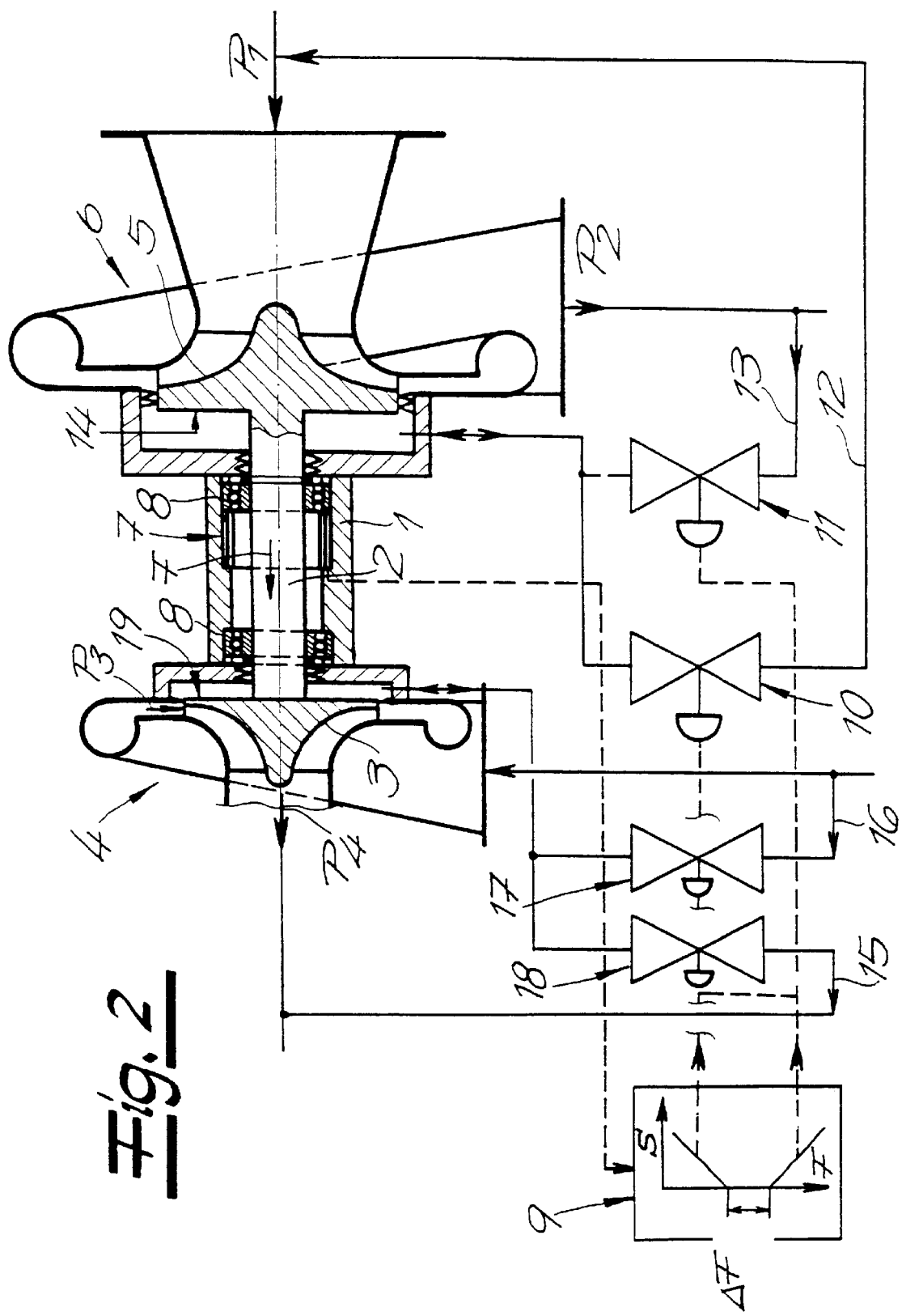
FIGS. 2 and 3 show other embodiments of the device as defined by the invention.

In the embodiment shown in FIG. 2, additional control lines 15, 16 are provided. Control lines 15, 16 are connected on the rear side of turbine rotor 3 to turbine expansion stage 4. Each comprises a pressure control valve 17, 18, controlled by controller 9. A further rotor piston surface 19, is sealed against housing 1 and located on the rear side of rotor 3 of the expansion turbine stage. Via the additional control lines, surface 19 is acted upon by the turbine feed pressure $p_3$ prevailing on the inlet of turbine expansion stage 4, and by the turbine outlet pressure $p_4$ on the outlet of expansion turbine stage 4. The additional rotor piston surface 19 is formed by a rear surface of turbine rotor 3 that is sealed against housing 1. The embodiment shown in FIG. 2 is used if very high compensation forces are required for compensating the axial thrust. In this connection, the pressure control valves 10, 11 installed in control lines 12, 13, and the pressure control valves 17, 18 installed in the additional control lines 15, 16 are wired in pairs so that the pressure changes occurring on the rotor control surfaces 14, 19 develop rectified effects. For example, a pressure rise occurring on rotor piston surface 14 of compressor rotor 5 is combined with a pressure reduction on rotor control surface 19 of turbine rotor 3. Pressure control valves 11 and 18 are consequently controlled.

Figure 3:
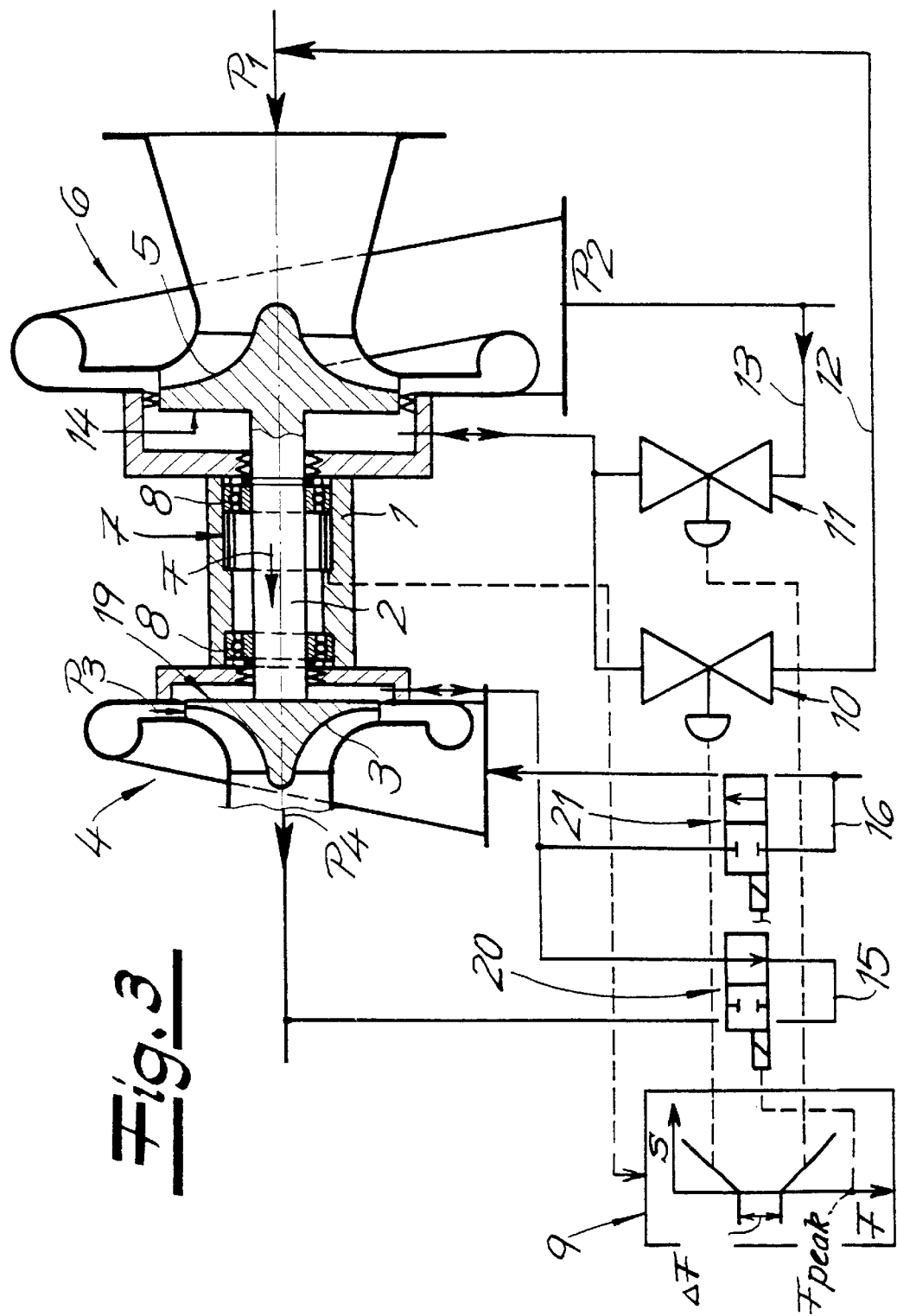

In the embodiment shown in FIG. 3, each of the additional control lines 15, 16 is also provided with a valve 20, 21. Valves 20 and 21 are rapidly opening switching valves, for example magnetic valves. If changes in the axial thrust occur abruptly, the one or the other switching valve is actuated depending on the direction of the axial thrust, and the associated rotor piston surface 19 on the rear side of turbine rotor 3 is acted upon by the full force of a lower or higher pressure $p_3$, $p_4$. It is understood that the measures described for FIGS. 2 and 3 can be combined with each other as well.

In the exemplified embodiments, rotor shaft 2 is supported in inclined high-precision ball bearings. Such bearings can be operated with a product of the rotational speed/diameter of up to $2.5 \times 10^6$ mm/min.

While only one embodiment of the present invention has been shown and described, it is to be understood that many changes and modifications may be made thereunto without departing from the spirit and scope of the invention as defined in the appended claims.

What is claimed is:

1. A turbo-machine comprising
   (a) a housing;
   (b) a rotor shaft rotatably supported in said housing, said rotor shaft having first and second ends;
   (c) a centripetally flow-through expansion turbine stage comprising an inlet, an outlet, and a first rotor mounted on the first end of said rotor shaft;
   (d) a radially flow-through compressor stage comprising an inlet, an outlet, and a second rotor mounted on the second end of said rotor shaft;
   (e) a measuring system disposed in said housing for measuring an amount of axial thrust of said rotor shaft, said measuring system comprising a ring-shaped force absorber, arranged between an outer bearing ring of a roller bearing in said housing and a stop surface of the housing, said ring being arranged on a side of said housing and stressed by an axial thrust of said rotor shaft;
   (f) at least two pressure control valves installed in at least two control lines connected to either said compressor stage or said expansion turbine stage; and
   (g) a controller coupled to said measuring system and controlling said at least two pressure control valves;
   wherein at least one of said first and second rotors has a rear side on which a rotor piston surface is located, said rotor piston surface being acted upon by the pressure prevailing on the inlet and outlet of the stage to which the piston surface is associated; and
   wherein said controller actuates in response to the measured axial thrust either the pressure control valve in the control line under the higher pressure or the pressure control valve in the control line under the lower pressure, so as to maintain the measured axial thrust within a preset tolerance range by raising or reducing the pressure.

2. The turbo-machine according to claim 1, wherein said rotor piston surface is on the rear side of the second rotor and said control lines are connected to said compressor stage; wherein said second rotor can be acted upon via the control lines by the pressure prevailing on the inlet to the compressor stage, and the pressure on the outlet of the compressor stage; and wherein the controller actuates in response to the measured axial thrust either the pressure control valve installed in the control line acted upon by the compressor inlet pressure, or the pressure control valve in the control line under the compressor outlet pressure.

3. The turbo-machine according to claim 1, wherein said rotor piston surface is on the rear side of the first rotor and said control lines are connected to said expansion turbine stage; wherein said first rotor can be acted upon via control lines by the pressure prevailing on the inlet into the expansion turbine stage and the pressure on the outlet of the expansion turbine stage; and wherein the controller actuates in response to the measured axial thrust either the pressure control valve in the control line acted upon by the inlet pressure, or the pressure control valve in the control line under the outlet pressure.

4. The turbo-machine according to claim 1, further comprising
   (a) at least two additional valves installed in at least two additional control lines connected to the other of said compressor and expansion turbine stages; and
   (b) an additional rotor surface sealed against said housing and located on the rear side of the other of said first and second rotors, said additional rotor piston surface being acted upon via said at least two additional control lines by the pressure prevailing on the inlet of said other stage and the pressure on the outlet of said other stage.

5. The turbo-machine according to claim 4, wherein said at least two additional valves are pressure control valves controlled by the controller.

6. The turbo-machine according to claim 4, wherein said at least two additional valves are rapidly opening switching valves.

7. The turbo-machine according to claim 1, wherein said force absorber comprises expansion measuring strips.

8. The turbo-machine according to claim 1, wherein said rotor shaft is supported in high-precision ball bearings.

* * * * *

UNITED STATES PATENT AND TRADEMARK OFFICE
CERTIFICATE OF CORRECTION

PATENT NO. : 6,616,423 B2
DATED : September 9, 2003
INVENTOR(S) : Bosen-2

It is certified that error appears in the above-identified patent and that said Letters Patent is hereby corrected as shown below:

<u>Title page,</u>
Item [73], Assignee, please insert the name of the assignee as follows:
-- Atlas Copco Energas GmbH, Köln (DE) --.
Item [76], "Haupstrasse" should be corrected to read -- Hauptstrasse --.

Signed and Sealed this

Third Day of August, 2004

JON W. DUDAS
*Acting Director of the United States Patent and Trademark Office*